Nov. 14, 1933.   R. J. NORTON   1,935,331
BRAKE APPARATUS
Filed June 12, 1931
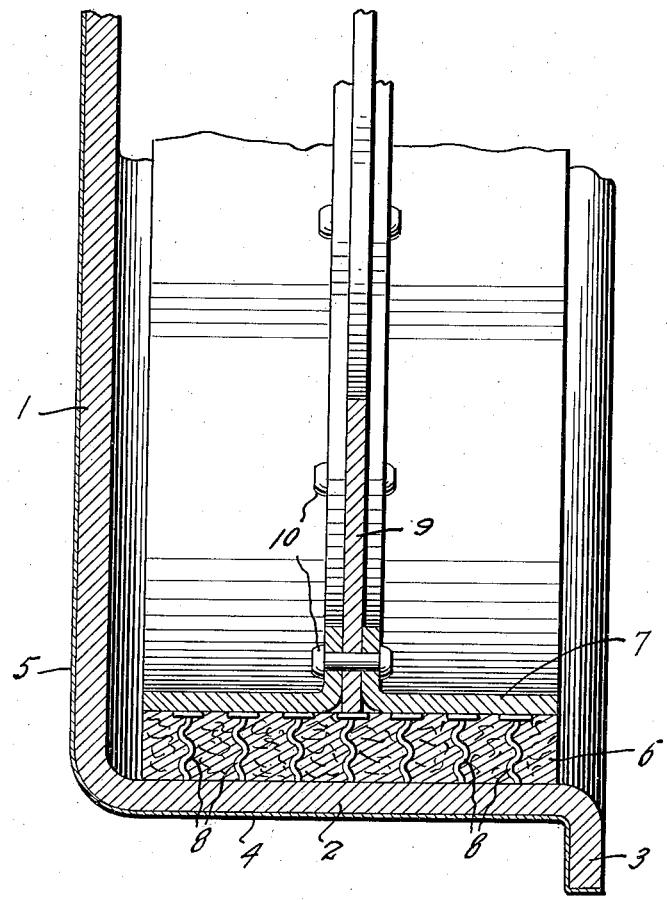
Inventor
RAYMOND J. NORTON
Semmes & Semmes
By and M. W. McConkey
Attorneys Patented Nov. 14, 1933

1,935,331

UNITED STATES PATENT OFFICE 1,935,331

BRAKE APPARATUS

Raymond J. Norton, Washington, D. C., assignor to Bendix Brake Company, South Bend, Ind., a corporation of Illinois Application June 12, 1931. Serial No. 543,947

4 Claims. (Cl. 188—264)

This invention relates to brake apparatus, and more particularly to an improved highly heat dissipative brake.

Heretofore relatively little has been done to rapidly and effectively dissipate heat generated in frictional brakes. The conventional form of brake comprises a cup shaped drum and an internal expanding member provided with a friction facing. In some constructions the generated heats of friction are more rapidly dissipated by forming fins on the exterior surface of the drum. A brake drum is essentially a machine for converting kinetic energy into heat and one of the major problems involved is the dissipation of this generated heat. This is particularly important at the present time because of the growing use of friction facings embodying synthetic resin binders. These resin binders carbonize at a relatively low temperature and hence if the frictional heats reach a very high temperature they tend to carbonize and then disintegrate.

Heretofore but little attention has been paid to the problem of cooling friction facings. As pointed out, such attempts as have been made have been confined largely to cooling the drum.

A major object of the present invention is to provide a brake apparatus which effectively and rapidly dissipates generated frictional heats.

Another object is to provide a brake apparatus which is characterized by a smoothness of operation and longevity.

A further object is to provide an improved brake shoe assemblage.

Yet another object is to provide a novel type of friction facing, cooperating shoe and drum.

With these and other equally important objects in view, the invention comprehends the concept of specially constructing the drum, the shoe and the lining, and so associating these three essential elements of the brake as to not only provide for a smooth operation during braking action, but also to effectively and rapidly conduct away the generated heats. In order to more clearly illustrate the invention, an embodiment of a preferred modification is shown in the single figure of the accompany drawing.

In carrying out the invention the thermal characteristics of each of the essential members of the brake are so modified and so respectively correlated as to cause them to function with the highest thermal efficiency.

In its more complete embodiment the invention comprehends the provision of a brake drum of either pressed steel or cast iron, with which is associated an internal expanding brake. It will be observed, however, that the principles of the invention may be utilized in an external contracting brake. The brake drum is of cast iron or pressed steel, having its exterior surface coated with or integrally formed of a material which is characterized by a high heat emissivity. For example, the external surface of the brake flange and/or the drum head may comprise a highly heat emissive substance, such as aluminum oxide. Other coatings or integral surface skins of specifically different materials characterized by a high heat dissipative factor may be employed. The aluminum oxide coating is preferable because this is not only very effective as a heat dissipator but it serves the secondary function of protecting the drum against corrosion. Within this drum is mounted a brake shoe preferably constructed in accordance with the disclosure of prior application Serial No. 501,942, filed December 12, 1930, of which the present application is a continuation in part. This shoe comprises a circumferential flange and one or more rigidifying flanges. In addition to these flanges the shoe is also provided with a plurality of heat radiating fins of large surface area. These fins may be truly circular or serpentine in formation and may be attached firmly to the circumferential flange of the shoe in any suitable manner, such as welding, soldering, brazing, etc. Preferably the metal of the fin is one which has a high coefficient of conductivity. In addition the exterior surface of the fins, and if desired the whole exterior surface of the shoe, is similarly coated with a material which is characterized by a high heat radiation factor.

Associated with the novel type of shoe structure is a novel friction facing. This may comprise a woven or felted lining bonded either with natural asphaltic materials, such as gilsonite, or with synthetic resins of the phenol methylene type. Preferably this lining is self cooling, self lubricating and highly heat conductive. As pointed out hereinbefore, a disadvantage attending the use of friction facings is the decomposition due to the retention of frictional heats. These facings are in themselves substantial heat insulators. The heat which is generated by frictional braking is absorbed and retained in the lining and is only slowly dissipated.

According to the present invention the generated frictional heats are not only rapidly withdrawn from the lining but may be rapidly absorbed in the lining. Utilization is made of this absorption of heat to subserve an important function, such as lubrication or diminution of the coefficient of friction. This is important because it is now found that as the temperature of the brake increases the tendency of the friction facing to grab likewise increases. By lubricating the friction facing or the drum surface at these high temperatures, the tendency towards grabbing is diminished.

As explained in copending application Serial No. 501,748, filed December 11, 1930, the friction facing may have incorporated therein in any suitable manner substances, either metallic or non-metallic, which are characterized by a high heat of phase transformation. Substances such as metallic bismuth, cadmium, inorganic salts such as sodium and potassium nitrate, etc., all of which absorb a relatively large amount of heat in passing from the solid to the liquid state, may be employed. Preferably substances are chosen whose melting point lies within the range of temperatures encountered in normal braking. Preferably also, a plurality of these substances having different and increasing melting points are employed so that the lubricating effect is progressive and continuous.

In addition means are provided for rapidly conducting away the generated heats of friction. In this manner the decomposable binders used in the friction facing are protected from the deleterious effects of heat by two methods, namely by absorbing some of the heat in some of the substances and thereby refrigerating the brake band, and also by rapidly conducting the generated frictional heats through and away from the lining. The generated frictional heats may be conducted away from the frictional facing in the manner fully described in prior application Serial No. 501,942, above referred to. This comprises essentially incorporating in the lining, at any desired stage of manufacture, metallic wires, preferably of high thermal conductivity and low gauge. These wires or metallic paths extend from the frictional engaging surface of the facing generally transversely through the lining and are exposed on the opposite face so that the facing is mounted on the shoe and good metallic contact between the wires and the metal of the shoe is made. If desired, some or all of these wires may be made up of metals or alloys which are characterized by a heat of phase transformation so that the wires or paths serve the double function of conducting away heat and of absorbing the heat and cooling and lubricating the facing.

It will be seen that in operation this type of brake is very effective from a thermal standpoint. As the brake is applied and frictional heats are generated, these will be rapidly conducted away from the lining, or more strictly the binder in the lining will be protected from these heats. This is done first by the rapid conduction of heat through the metal of the drum, and by the rapid radiation or dissipation of these heats from the highly heat dissipative exterior surface of the drum. Concomitantly with this transfer of heat, and when the temperature of the brake rises, heat will be absorbed in the metallic or non-metallic inclusions in the band, transforming these from the solid to the liquid phase. These materials then cool down the band or, more strictly, maintain the band at a relatively low temperature, and at the same time tend to lubricate the frictional surface of the band and thereby diminish the coefficient of friction between the band and the drum and smooth out the braking action. If desired, this lubricating function may be augmented by incorporating solid lubricants in the friction facing, such for example as graphite, insoluble soap, etc. At the same time heat is withdrawn from the friction facing by another path. The metallic wires incorporated in the band, since they form a continuous metallic path from the heat generating surface to a heat dissipative surface, rapidly withdraw a large quantity of the generated heat. This heat is conducted through the metal wires to the metal of the shoe and thence to the large heat radiation area comprised by the extended fin surfaces on the shoe. The heat thus conducted to the metal of the shoe and to the fins is rapidly radiated from the surface of the fins by reason of the highly heat dissipative characteristics of this surface.

As shown in the drawing, the invention includes a drum having a brake head 1, circumferential flanges 2 and a marginal rigidifying flange 3. This may be made of any desired material but preferably is of the deep-draw pressed-steel stamping. In accordance with the principles set forth herein, the exterior surface of the brake drum is formed of a material which is characterized by a high heat emissivity. This may, for example, comprise a coating 4 of any suitable material which radiates heat in a rapid manner, and preferably comprises a coating of aluminum oxide. This coating may be applied only to the circumferential flange, but if desired may be extended over the exterior surface of the head, as shown at 5. Within the drum is mounted a brake shoe structure which is operated by any desired means, such as a cam, toggle or the like, with which is associated a novel lining. As shown in the drawing, the lining or friction material 6 may comprise a woven or felted asbestos bonded with a synthetic resin, and preferably with a phenolic condensation product. This friction material is attached in any desired manner to the subjacent securing flange 7 of the shoe. In accordance with the principles described hereinbefore, the lining is provided with the filaments or wires 8 of a high thermal conductivity which extend from the frictional engaging surface to the flange 7 of the shoe and at this flange are extended or enlarged to make good mechanical contact over a relatively large area.

The shoe preferably comprises L-shaped stampings secured back to back. Interposed between the L-shaped stampings is a fin 9. The adjacent flanges of the shoe section 7 and the fin 9 are held in fixed relationship by means of suitable securing members, such as the rivets 10. In lieu of these rivets other types of securing means, such as welding, may be employed. Preferably the fin 9 extends outwardly of the brake shoe 7 a considerable distance so as to present a relatively large surface area for the dissipation of generated heats, both by convection and radiation. Furthermore, the heat dissipation from the fin may be increased by applying to the surface thereof materials characterized by a high degree of heat emissivity.

It will now be seen that the present brake apparatus is a very effective heat absorption and heat dissipative assemblage. According to the present invention the drum and the shoe are utilized to their maximum as heat conductive and dissipative surfaces, thereby keeping the temperature of the friction facing relatively low and prolonging its life. Furthermore the friction facing is additionally protected by reason of the rapid conduction of the generated heats by means of the metal wires which contact with the shoe. Additionally, the metallic and non-metallic inclusions of the band absorb a considerable amount of heat, within certain ranges, and the heat thus absorbed is abstracted from the lining. In short, all of the elements of the brake apparatus are modified and correlated to subserve the major function of preventing or at least minimizing the deleterious thermal action upon the friction facing.

While a preferred embodiment of the invention has been described, it is to be understood that this is given largely by way of example. It will be understood that within the principles herein set forth a relatively large number of specific materials and different forms of construction may be employed.

I claim:

1. A brake apparatus comprising a ferruginous brake drum having an exterior surface of high heat emissivity, a brake shoe having seat dissipating fins thereon and a lining interposed between the shoe and drum and having exposed metallic members passing therethrough and contacting with the shoe and drum during brake application.

2. A brake apparatus comprising a ferruginous brake drum and shoe, the exposed surface of each of which is treated to increase the heat dissipation therefrom, a lining attached to the shoe and having metallic members, each of which contacts with each the drum and shoe during brake application.

3. A brake apparatus comprising a pressed steel brake drum having a highly heat dissipative exterior surface in combination with a brake shoe having heat dissipative fins thereon and a lining attached to the shoe, the lining comprising a bonded asbestos material having fusible metal wires extending therethrough and exposed at opposite faces of the lining.

4. A brake apparatus comprising a brake drum having an exterior surface of a heat emissivity higher than iron, a brake shoe having a heat dissipative fin thereon and a resin bonded asbestos friction facing attached to the shoe; the facing having fusible metal wires extending therethrough and exposed at opposite faces of the lining.

RAYMOND J. NORTON.